United States Patent Office 3,721,797
Patented Mar. 20, 1973

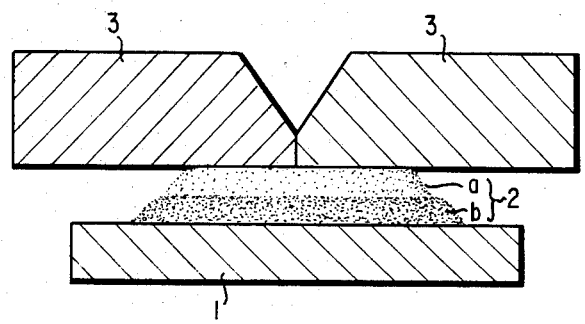

3,721,797
WELDING PROCESS AND PLURAL LAYERED
BACKING MATERIAL
Masayasu Arikawa and Motomi Kano, Fujisawa, and
Naoki Okuda, Kamakura, Japan, assignors to Kobe
Steel, Ltd., Kobe, Japan
Filed Mar. 18, 1970, Ser. No. 20,657
Claims priority, application Japan, Mar. 25, 1969,
44/22,587; Dec. 4, 1969, 44/97,458
Int. Cl. B23k 9/02
U.S. Cl. 219—137          6 Claims

ABSTRACT OF THE DISCLOSURE

A single-side welding process is facilitated by the use of a flux material which is held against the back of the workpieces to be joined by a copper backing strip. At least 40% by weight of the flux is in particulate form having a particle size of less than 840μ. The flux also contains a binder material which is fusible under the influence of the arc heat.

BACKGROUND OF THE INVENTION

Field of the invention

This invention relates to a welding process and more particularly to improvements in a single-side welding process wherein a granular flux and a copper backing strip are employed to facilitate favorable welding.

Description of prior art

Single-side welding is a well-known technique in the prior art. In carrying out this type of welding, the metal workpieces intended to be joined are tapered along their welding edges so that a V-shaped seam or groove is provided between the adjacent workpieces when they are brought into welding juxtaposition. The welding metal is then laid down along the seam so that the intense heat of the welding arc produces a pool of molten metal at the joint. A backing strip is usually provided on the side of the joint opposite the groove in order to prevent the loss of any molten welding metal. A wide variety of backing strips have been used in the prior art, including steel, refractory metal, copper strips, various fluxes, fluxes admixed with thermosetting resins, and combinations of copper strips and flux material. When a granular flux is used as the backing material, it is known that the flux can be adhered to the joint upon heating so as to form a penetration bead within the groove. Depending upon the particular composition of the slag used in the welding process, the molten weld metal will be sustained so that a uniform penetration bead can be obtained. When the backing material is a flux mixed with a thermosetting resin, the resin will be initially melted by the welding heat thereby consolidating the granular flux before the weld is formed. The flux is thus adhered to the back of the workpiece in conformity with its shape so that a uniform penetration bead will be obtained.

When a granular flux is used, it is usually retained within a groove formed in a backing strip and is held adjacent to the back of each of the workpieces to be joined. As the penetration bead is formed, the flux has been found to lose much of its bondability to the extent that when the arc is applied to the groove between the workpieces, displacement of the granular flux frequently occurs. Consequently, there is a tendency for some of the molten weld metal to escape at localized portions along the workpiece groove causing an uneven corrugation of the resulting bead and/or overlapping of deposited weld metal. Moreover, the reduced amount of slag formed at certain positions will cause small recesses and/or undercutting of the bead. Even where the flux is mixed with a thermosetting resin, these problems are not resolved and, depending upon the particular welding conditions, for example, where the force of the arc is very high, these problems may actually be increased.

SUMMARY OF THE INVENTION

Accordingly, it is an object of the present invention to effectively eliminate the above-mentioned defects and to provide an improved single-side welding process wherein the backing strip comprises a copper strip, a flux material, and a thermosetting resin. According to this invention, a space, defined by the back of the workpieces to be joined and the copper strip, is filled with a flux wherein at least 40% by weight of the flux is in particulate form having a particle size of less than 840μ, and containing a suitable binder which is capable of being thermoset by the heat of the arc during the welding operation.

BRIEF DESCRIPTION OF THE DRAWING

The single drawing illustrates an end view of the joint of the workpieces which is welded in accordance with the single-side welding process of the present invention.

DETAILED DESCRIPTION OF PREFERRED EMBODIMENTS

According to the present invention, the portion of the flux adjacent to the back of the groove between the workpieces is in a relatively finely pulverized form and a suitable binder is added. In other words, the flux material is freely flowing and is not bound by said binder, since the binder does not become thermoset until the application of the welding heat. During the welding operation, the binder is fused by the welding heat so as to consolidate the granular flux and thereby provide a favorable penetration bead. This favorable bead is only provided, however, where at least 40% of the total flux by weight is in a particulate form having an average particle size of less than 840μ. If the granularity of the flux particles is too coarse, the binder added to the flux will not sufficiently act in its fused condition to bond the flux particles and displacement of the particles may occur when the arc is applied, resulting in the escape of molten weld metal. This will result in severe undercutting, overlapping, and/or the formation of recesses in the resulting bead.

Since the flux of the present invention is supported by a copper backing strip, which has a relatively high degree of heat conductivity, the cooling of the deposited weld metal is facilitated so that the flux can be more uniformly pressed in order to regulate the thickness of the resulting bead. Thus, flaws resulting from the escape of molten weld metal are not formed, and the resulting smooth penetration bead can be obtained with a substantially reduced number of recesses. In other words, the present invention combines the advantages of using a copper backing strip and using a binder with the flux so that a good penetration bead can be obtained.

A wide variety of granular flux materials can be employed in connection with the present invention, such as ordinary welding flux materials containing a deoxidizing agent, compounds which may be transformed into slag upon being fused, or powdered metal. However, it is advantageous to use a composite flux as will now be described.

The flux which is preferably used in the single-side welding process of the present invention, comprises principally a pulverized metal and a non-metallic powdered material. The pulverized metal consists mainly of powdered iron and a powdered deoxidizing agent. The average apparent specific gravity of the mixture is in the range of 2.0 to 4.5. Good results are obtainable when the powdered metal comprises between 5 and 75%, relative to the total weight of the composite flux. The non-metallic powdered materials are characterized by a basicity of not less than 1.0 and usually comprises 5 to 70 parts by weight MgO, 3 to 40 parts by weight CaO, 10 to 75 parts by weight of MgO+CaO, 3 to 40 parts by weight $SiO_2$, 1 to 15 parts by weight $CaF_2$, 0.5 to 8 parts by weight of $Na_2O+K_2O$, and 1.5 to 16 parts by weight of a carbonate corresponding to carbon dioxide. The above-mentioned parts by weight are based on the content of the non-metallic powdered material which occupies at least 75% of the total weight of the composite flux.

The granular flux to be used in the single-side welding process as hereinbefore described, must in general satisfy the following requirements:

(I) The resulting slag from the flux covering the molten welding metal must have a uniform thickness in the lengthwise direction and must be capable of providing a uniform corrugation of uniform quality.

(II) The flux in its fused state must have a sufficient viscosity to sustain the penetration bead in its molten state during the welding operation and thereby prevent the lateral outflow of molten weld metal. Its viscosity must also be sufficient to prevent penetration of the molten welding metal into the particles of the backing flux, since either of these conditions could result in the formation of flashes or burrs on the joint of the workpieces.

(III) The flux should not yield a harmful gas when the arc is applied which cannot easily be ventilated, yet it should be capable of effectively removing gaseous nitrogen and oxygen which is present from the surrounding air, or gaseous hydrogen and water vapor, which may be initially contained in the flux, in the copper backing strip, or in the workpieces. These gases could be extremely detrimental to the welding process by preventing the formation of a strong joint between the workpieces.

In order to satisfy the first and second requirements, it is desirable that the flux contain a powdered metal in a proportion of from 5 to 75% by weight relative to the total weight of the flux, such that the amount of slag formed in a thin layer over the molten weld metal will uniformly sustain the penetration bead.

If the proportion of the powdered metal contained in the flux is less than 5%, the desirable improvements described above cannot be obtained. On the other hand, if the quantity of powdered metal exceeds 75% by weight, a penetration bead having a uniform corrugation and a glossy surface will not be obtained.

Even if the flux contains the powdered metal in the desired proportions of 5 to 75% by weight, as hereinbefore specified, cohesion of the powdered metal on the surface of the resulting penetration bead may sometimes occur without being completely melted into the deposited weld metal. In this instance, the volume ratio of the powdered metal to the non-metallic powdered metal becomes the dominant factor which controls the degree of weldability.

In other words, if the powdered metal has a small specific gravity and predominates by volume over the non-metallic powder, the powdered metal may become consolidated on the surface of the resulting penetration bead and only the surface tension of the slag will act to smooth the penetration bead. On the other hand, if the powdered metal has a very high specific gravity and is only present in a small amount by volume, as compared to the volume of the non-metallic powder, the same effect will occur as in the case where the powdered metal in the composite flux is present in an amount of less than the lower limit of the above-specified proportions, thereby resulting in an uneven formation of slag.

For the above reason, the average apparent specific gravity of the powdered metal contained in the flux should be between 2.0 and 4.5.

In addition, in order to satisfy the first and second requirements, the non-metallic powdered material should have a small viscosity variation in its melted state and should have a temperature-viscosity relationship such that its viscosity will increase considerably with an increase in temperature, for example, the maximum value of viscosity may be obtained at a temperature in the range of 1,050° C. to 1,250° C. The resulting slag can thus uniformly sustain the molten welding metal and thereby prevent the molten welding metal from flowing from the weld line. This further enables the formation of a good penetration bead having a good corrugation.

Each of the compounds employed for preparing the nonmetallic powdered material contained in the flux, in accordance with the present invention, will now be described with respect to their effect on the composition and their relationship to the composition.

MgO: When contained in proportions of 5 to 70 parts by weight, MgO will provide a uniform slag covering for the molten welding metal, i.e., a good penetration bead.

CaO: CaO will provide the same effects as that of the MgO and the sum of the contents of MgO and CaO is similarly restricted.

$SiO_2$: Together with the CaO and MgO, $SiO_2$ will act to adjust the melting point of the slag. If the content of $SiO_2$ is less than 3 parts by weight, the melting point of the slag will be considerably increased, while, if it is greater than 40 parts by weight, the melting point of the slag will be considerably reduced, thereby preventing the formation of a good penetration bead having a good corrugation.

$CaF_2$: $CaF_2$ acts to adjust the fluidity of the slag in cooperation with the CaO+MgO. If the content of $CaF_2$ is less than 1 part by weight, the fluidity is undesirably reduced and the slag begins to gather locally. Also, the metallic powder, transferred from the slag, begins to consolidate on the surface of the penetration bead. If the content of $CaF_2$ exceeds 15 parts by weight, the slag becomes excessively fluid so that a smooth penetration bead cannot be obtained.

$Na_2O$ and $K_2O_3$: Upon the formation of the penetration bead, the $Na_2O$ and $K_2O$ act to deposit the penetration bead onto the workpieces to be welded. To facilitate this deposition, the content of the $Na_2O$ and $K_2O$ should be greater than 0.5 part by weight. If less is present, an undesirable amount of overlapping can occur. If more than 8 parts by weight are present, the viscosity of the non-metallic powdered material will be undesirably reduced and a good penetration bead may not be obtained.

Even if 75% of the non-metallic powdered materials in the composite flux are comprised of the above-mentioned compounds, other compounds, such as $Al_2O_3$, BaO, $ZrO_2$, $Cr_2O_3$, and/or MnO may be added so long as they are contained in proportions of not more than 25% by weight relative to the total weight of the non-metallic powdered materials.

Up to this point, the features of the flux used in the present invention have been described with respect to the first and second requirements which the flux must satisfy for use in a single-side arc welding process. However, the flux should also satisfy the third requirement as well.

In order to satisfy the third requirement, the flux should contain a sufficient amount of deoxidizer and must be capable of yielding a suitable amount of harmless gas when the arc is applied. The presence of the secondary gas will substantially reduce the partial pressure of the water vapor and the gaseous hydrogen existing in the welding atmosphere.

For this purpose, it is desirable to include a substance in the flux which will yield Co or $CO_2$ under the influence of the arc heat. The carbonate compounds have been found to be especially good gas producers when added to the flux in an amount of from 1.5 parts to 16 parts by weight based on $Co_2$. If less than 1.5 parts by weight is added, numerous blowholes can be formed in the deposited weld metal, while if more than 16 parts by weight is added, an excessive amount of gas is produced which tends to reduce the workability of the welding operation.

The carbonate may be added in the form of $MgCO_3$ or $CaCO_3$. The advantages of this compound is that it simultaneously adds MgO or CaO to the flux as it decomposes and thus serves the requirements indicated above.

Suitable oxidizers include metallic Si, Mn, or Al or alloys of the same. The metals or their alloys can preferably be prepared directly in the flux, and it is preferable that a portion of the powdered metal in the flux be in the form of deoxidizing metallic powder. The content of the deoxidizer may vary with the quality of the workpieces to be joined and the degree of contamination of the grooves between the workpieces.

As it is well known, in single-side welding, the arc is applied to the front side or the grooved side of the workpieces. One hundred percent penetration should be obtained with respect to the molten weld metal while the arc is applied. During this operation, the resulting deposited weld metal has a tendency to be deposited in a pear-shaped form and to easily crack and contain fine blowholes including non-metallic foreign inclusions. In order to eliminate such defects, the slag in its molten state must have a suitable basicity and a sufficient fluidity so that the deoxidizing reaction is readily facilitated resulting in improvements in the degasification effect. For this purpose, the non-metallic powdered material should preferably have a basicity of not less than 1.0. The proper fluidity is obtained by the use of the aforementioned non-metallic powdered materials in the indicated proportions.

The iron powder referred to above, includes ferrous material supplied by said deoxidizer metals or their alloys.

The binder added to the flux in accordance with the present invention may be selected from a wide variety of thermosetting resin powders, such as phenol resin, urea resin, and formalin resin, of fat, wax, and paraffin, inasmuch as they are melted by the heat. The content of the binder of the flux is preferably not more than 10% relative to the total weight of the flux. Alternatively, a powdered glass having a softening point in the range of 1,000° C., may be added to the flux in a proportion of not more than 20%.

If a thermosetting resin, fat, wax or paraffin, used as the binding agent, tends to generate harmful gases such as hydrogen during the welding operation, it is preferable to use a copper backing strip which will not provide ventilation for the flux and to restrict the amount of binder used to no more than 10% of the flux. Where glass is used as the binder, the glass should have a softening point in the range of not more than 1,000° C., so that it may be melted by the welding. Good results are obtainable when the glass is used in an amount of not more than 20%, so as not to reduce the melting point of the flux to such an extent that the penetration bead cannot be sustained in its molten state.

The flux prepared in accordance with the present invention is deposited in a space defined by a copper backing strip and the workpieces to be joined. In this instance, a conventional flux may be applied directly to the surface of the copper backing strip while the flux of the present invention should be applied between the ordinary flux and the workpieces.

The thickness of the total flux sandwiched between the back of the groove and the copper backing strip is preferably in the range of 2 mm. to 15 mm. If the thickness is less than 2 mm., the flux will not be sufficiently deposited onto the workpieces to be joined and it will tend to flow laterally outward from the welding line to an extent that the features of the present invention cannot be fully appreciated. If the thickness exceeds 15 mm., the quantity of the penetration bead cannot be controlled by the copper backing strip as in conventional flux backing methods.

With reference to the attached drawing, it can be seen that the flux 2 is sandwiched between the copper backing strip 1 and the workpieces to be joined 3. The flux comprises an upper layer $a$ containing the thermosetting resin, which is hereinafter referred to as "resin containing flux layer," and the lower layer $b$ of flux which is free of said resins.

Accordingly, the content of any one of fat, wax, and/or paraffin is reduced relative to the total weight of the flux, and each particle of lower layer being more coarse than that of the upper layer will facilitate the escape of harmful gas.

If the particles of flux constituting the lower layer is sufficiently coarse, and the escape of harmful gas generated therefrom is facilitated, any one of fat, wax, and/or paraffin may be contained in all of the layers.

The present invention having now been generally described, a further understanding can be obtained by reference to certain specific examples which are provided herein for purposes of illustration only and are not intended to be limiting in any manner.

EXAMPLE I

Two steel sheets, each 25 mm. in thickness were joined together in accordance with a submerged arc welding process under the following conditions with the use of a copper backing strip. A first layer, 3 mm. in thickness, of a sintered flux containing powdered iron in a proportion of 50% and a second layer, 2 mm. in thickness and positioned above the first layer, of a sintered flux containing powdered phenol resin in a proportion of 0.78% without said powdered iron were sandwiched between said copper backing strip and the steel sheets to be joined along the welding line. The powdered phenol resin had a particle size of 840μ and occupied a proportion of 72% relative to the total weight of the phenol resin.

Submerged arc welding conditions

Electrodes _____ Tandem arrangement.
  Leading electrode ___ 1,250 A.—35 v.—45 cm./min.
  Trailing electrode __ 950 A.—45 v.—45 cm./min.

As a result, a uniformly corrugated penetration bead could be obtained.

EXAMPLE II

Two steel sheets, each 25 mm. in thickness, were joined together in accordance with a submerged arc welding process under the conditions as in Example I with the use of a copper backing strip, 100 mm. in width and 20 mm. in thickness, having a groove of 3 mm. in depth and 70 mm. in width. The groove was filled with a first layer of a sintered flux containing powdered iron in a proportion of 50% and a second layer, 1 min. in thickness, and positioned above said first layer, of a fused flux having particles of less than 840μ in a proportion of 90%, said fused flux being wet-coagulated with 1.20% of phenol resin and the water content thereof being removed therefrom. As a result, a good penetration bead without any irregular corrugations or undercuts was obtained.

EXAMPLE III

Two steel sheets, each 30 mm. in thickness, were joined together in accordance with a submerged arc welding process under the following conditions with the use of a copper backing strip, 100 mm. in width and 15 mm. in thickness. A layer of a sintered flux containing powdered glass of 840° C. melting point in a proportion of 5.8% and having a particulate size of less than 840μ in a proportion of 72% relative to the total weight of the sintered flux, was sandwiched between the copper backing strip and the steel sheets to be joined along the welding line.

Submerged arc welding conditions

Electrodes _____ Tandem arrangement.
  Leading electrode __ 1,300 A.—35 v.—40 cm./min.
  Trailing electrode __ 1,100 A.—45 v.—45 cm./min.

EXAMPLE IV

Two steel sheets, each 30 mm. in thickness, were joined together in accordance with the welding process as in Example III with the use of a copper backing strip, 100 mm. in width and 20 mm. in thickness, having a groove of 50 mm. in width and 3 mm. in depth. This groove was filled with a first layer of a sintered flux containing powdered iron in a proportion of 50% and a second layer, 1 mm. in thickness and positioned above said first layer, of a sintered flux having particles of less than $840\mu$ in a proportion of 90%. The sintered flux was prepared by wet coagulation with paraffin in a proportion of 1.20% with the water content being removed therefrom. As a result, the same effects as in Example III could be obtained.

EXAMPLE V

Two steel sheets, each 25 mm. in thickness, having a Y-shaped groove of 45 degrees were joined together in accordance with a submerged arc welding process under the following conditions while being backed by a copper backing strip, 120 mm. in width and 12 mm. in thickness. At this time, a layer of a sintered flux, 5 mm. in thickness, was uniformly sandwiched between said copper backing strip and the steel sheets.

Leading electrode—1,250 A.—35 v.—45 cm./min.
   (Wire electrode, 4.8 mm. in diameter)
Trailing electrode—1,000 A.—45 v.—45 cm./min.
   (Wire electrode, 4.8 mm. in diameter)

The sintered flux employed in this example consists of powdered metal and non-metallic powdered material, said powdered metal comprising powdered iron in a proportion of 37.5% of 2.75 in average apparent specific gravity, Fe-Si of 3.50 in average apparent specific gravity in a proportion of 3.8% and Fe-Mn of 3.45 in average apparent specific gravity in a proportion of 4.2% while said non-metallic powdered material comprising:

| | Percent |
|---|---|
| $SiO_2$ | 21.5 |
| $CaF_2$ | 7.6 |
| $Na_2O + K_2O$ | [1] 2.4 |
| $CO_2$ | [2] 6.3 |
| $Al_2O_3$ | 3.0 |
| Phenol resin | [3] 2.8 |

[1] Percent of water glass.
[2] 14.2% if $CaCO_3$ employed.
[3] In the powdery form.

and having a basicity of 2.6 and having particles as hereinbelow defined:

| | Percent |
|---|---|
| More than $840\mu$ | 29.5 |
| $840\mu$ to $210\mu$ | 58.7 |
| Less than $210\mu$ | 12.2 |

As a result, a penetration bead of good corrugation was obtained.

EXAMPLE VI

Two steel sheets, each 30 mm. in thickness, having an X-shaped grove of 45 degrees at the front side and 60 degrees at the back side were joined together in accordance with a submerged arc welding process under the following conditions:

Leading electrode—1,350 A.—35 v.—40 cm./min.
   (Wire electrode, 4.8 mm. in diameter)
Trailing electrode—1,100 A.—47 v.—40 cm./min.
   (Wire electrode, 4.8 mm. in diameter)

At this time, a copper backing strip, 100 mm. in width and 20 mm. in thickness, connected in the form of a long strip, was employed for backing means and was filled with a first layer of 6 mm. in thickness of a commercial flux (PFH-45) and a second layer of 3 mm. in thickness of a sintered flux.

The sintered flux employed in this example comprises a powdered metal containing powdered iron of 3.20 in average apparent specific gravity in a proportion of 10.2%, FeSi of 3.15 in average apparent specific gravity in a proportion of 2.5% and FeMn of 4.21 in average apparent specific gravity in a proportion of 3.1%, and a non-metallic powdered material containing:

| | Parts |
|---|---|
| MgO | 7.2 |
| CaO | [1] 34.0 |
| $SiO_2$ | 20.3 |
| $CaF_2$ | 14.0 |
| $TiO_2$ | 14.2 |
| Powdered glass | [2] 5.1 |
| $Na_2O$ | [3] 2.0 |
| $CO_2$ | 3.2 |

[1] 7.8 parts if $CaCO_3$ employed.
[2] Melting point at 875° C.
[3] Percent of water glass.

and having a basicity of 1.6 and having particles of the size as hereinbelow defined in the respective proportions:

| | Percent |
|---|---|
| More than $840\mu$ | 9.6 |
| $210\mu$ to $840\mu$ | 40.0 |
| Less than $210\mu$ | 50.2 |

As a result, a penetration bead of uniform corrugation without recesses or undercuts was obtained.

EXAMPLE VII

Two steel sheets, each 12 mm. in thickness, having a V-shaped groove of 45 degrees were joined together in accordance with a non-gas welding process under the following condition with the use of a copper backing strip of 70 mm. in width and 7 mm. in thickness. A sintered flux was sandwiched between the copper backing strip and the steel sheets, and a penetration bead of uniform corrugation was obtained.

Welding condition: 360 A.—27 v.—15 cm./min. (Wire electrode, 3.2 mm. in diameter)

The sintered flux herein employed comprises powdered metal containing powdered iron of 3.50 in average apparent specific gravity in a proportion of 10.5%, Fe-Al of 2.54 in average apparent specific gravity in a proportion of 10.4% in which Al is contained in a proportion of 26.4%, Fe-Si of 3.50 in average apparent specific gravity in a proportion of 1.08%, Fe-Mn of 3.45 in average apparent specific gravity in a proportion of 4.2%, Ni metal of 4.21 in average apparent specific gravity in a proportion of 10.6% and Fe-Mo of 3.65 in average apparent specific gravity in a proportion of 2.10%, and non-metallic powdered material containing the following compounds in a proportion of 59.4% relative to the total weight of said sintered flux:

| | Parts |
|---|---|
| MgO | 6.1 |
| CaO | [1] 30.6 |
| $SiO_2$ | 4.0 |
| $CaF_2$ | 14.8 |
| $Al_2O_3$ | 22.3 |
| $CO_2$ | 15.2 |
| Paraffin | 5.5 |
| $Na_2O$ | 1.5 |

[1] 34.6 parts if $CaCO_3$ employed.

having the basicity of 2.0 and having particles of the size as hereinbelow defined in the respective proportions:

| | Percent |
|---|---|
| More than $840\mu$ | 13.2 |
| $210\mu$ to $340\mu$ | 49.6 |
| Less than $210\mu$ | 37.2 |

Having now fully described the invention, it will be obvious to one of ordinary skill in the art that many changes and modfiications can be made without departing from the spirit or scope thereof.

Accordingly, what is claimed and intended to be covered by Letters Patent is:

1. A backing material which is useful in a single-side welding process which comprises the flux material in the form of two, distinguishable, overlaping and essentially parallel layers, wherein the first of said layers is formed adjacent to a copper strip, and the second of said layers is formed over said first layer, and wherein at least 40% by weight based on the total weight of the flux in said first layer is in a particulate form characterized by a particle size of less than $840\mu$ and wherein the flux material in a said second layer is in a freely flowing particulate form characterized by a particle size of greater than $840\mu$ and wherein said second layer contains a binder material selected from the group consisting of thermosetting resin, fat, wax, paraffin, and glass having a softening point of not more than 1,000° C., which is fusible under the influence of an arc used in an arc welding process, and wherein said first layer is free of said binder.

2. The backing material of claim 1 wherein said thermosetting resin is selected from the group consisting of phenol resin, urea resin, and formalin resin.

3. The backing material of claim 1 wherein said flux comprises the admixture of up to 75% by weight based on the total weight of the flux of the powdered non-metal and 5 to 75% by weight based on the total weight of the flux of the powdered metal, wherein said powdered metal consists essentially of a mixture of pulverized iron and a powdered deoxidizer having an average apparent specific gravity of from 2.0 to 4.5 and wherein said powdered non-metal consists essentially of a mixture of compounds selected from the group consisting of MgO, CaO, $SiO_2$, $Na_2O$, $K_2O$, $CaF_2$, and a carbonate compound having a basicity of at least 1.0.

4. The backing material of claim 3 wherein said powdered non-metal consists essentially of:

5 to 70 parts by weight MgO
3 to 40 parts by weight CaO
10 to 75 parts by weight MgO+CaO
3 to 40 parts by weight $SiO_2$
1 to 15 parts by weight $CaF_2$
0.5 to 8 parts by weight $Na_2O+K_2O$
1.5 to 16 parts by weight of a carbonate corresponding to carbon dioxide.

5. In a single-side arc welding process wherein a copper strip is used as the backing material for the workpieces intended to be joined, the improvement comprising:

applying a freely flowing granular flux material in the form of two, distinguishable, overlapping and essentially parallel layers, wherein the first of said layers is formed adjacent to said copper strip, and the second of said layers is formed over said first layer, and wherein at least 40% by weight based on the total weight of the flux in said first layer is in a particulate form characterized by a particle size of less than $840\mu$ and wherein the flux material in said second layer is in a particulate form characterized by a particle size of greater than $840\mu$ and wherein said second layer contains a binder selected from the group consisting of thermosetting resin, fat, wax, paraffin, and glass having a softening point of not more than 1,000° C., which is fusible under the influence of an arc used in an arc welding process, and wherein said first layer is free of said binder.

6. The process of claim 5 wherein said thermosetting resin is selected from the group consisting of phenol resin, urea, resin, and formalin resin.

References Cited

UNITED STATES PATENTS

| 3,418,179 | 12/1968 | Raynes et al. | 148—24 |
| 3,490,960 | 1/1970 | Arikawa et al. | 148—24 |
| 3,589,951 | 6/1971 | Arikawa et al. | |

FOREIGN PATENTS

| 1,109,856 | 4/1968 | Great Britain | 148—24 |
| 1,138,974 | 1/1969 | Great Britain | 148—24 |

ALLEN B. CURTIS, Primary Examiner

U.S. Cl. X.R.

29—191.2; 148—24; 219—160

UNITED STATES PATENT AND TRADEMARK OFFICE
Certificate
Patent No. 3,721,797                                Patented March 20, 1973

Masayasu Arikawa, Motomi Kan, and Naoki Okuda

Application having been made by Masayasu Arikawa, Motomi Kan, and Naoki Okuda, the inventors named in the patent above identified, and Kobe Steel, Ltd., Fukiai-ku, Kobe, Japan, the assignee, for the issuance of a certificate under the provisions of Title 35, Section 256, of the United States Code, deleting the name of Katsuro Iio as a joint inventor, and a showing and proof of facts satisfying the requirements of the said section having been submitted, it is this 1st day of July 1975, certified that the name of Katsuro Iio is hereby deleted to the said patent as a joint inventor with the said Masayasu Arikawa, Motomi Kan, and Naoki Okuda.

FRED W. SHERLING,
*Associate Solicitor.*

Disclaimer 3,721,797.—*Masayasu Arikawa* and *Motomi Kano*, Fujisawa, and *Naoki Okuda*, Kamakura, Japan. WELDING PROCESS AND PLURAL LAYERED BACKING MATERIAL. Patent dated Mar. 20, 1973. Disclaimer filed Apr. 1, 1974, by the assignee, *Kobe Steel, Ldt.*

The term of this patent subsequent to Dec. 22, 1987, has been disclaimed.

[*Official Gazette October 21, 1975.*]

UNITED STATES PATENT OFFICE
CERTIFICATE OF CORRECTION

Patent No. 3,721,797            Dated March 20, 1973

Inventor(s) Masayasu Arikawa and Motomi Kano and Naoki Okuda

It is certified that error appears in the above-identified patent and that said Letters Patent are hereby corrected as shown below:

Column 4, line 40, delete $K_2O_3$ and insert --$K_2O$--.

Column 9, line 10, delete "first" and insert --second--;
        line 12, delete "second" and insert --first--.

Column 10, line 12, delete "first" and insert --second--;
        line 15, delete "second" and insert --first--.

Signed and Sealed this ninth Day of March 1976

[SEAL]

Attest:

RUTH C. MASON
*Attesting Officer*

C. MARSHALL DANN
*Commissioner of Patents and Trademarks*